(12) United States Patent
Nguyen et al.

(10) Patent No.: US 10,078,663 B2
(45) Date of Patent: Sep. 18, 2018

(54) DUAL OVERLAY QUERY PROCESSING

(71) Applicant: Red Hat, Inc., Raleigh, NC (US)

(72) Inventors: Filip Nguyen, Brno (CZ); Filip Elias, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 781 days.

(21) Appl. No.: 14/527,444

(22) Filed: Oct. 29, 2014

(65) Prior Publication Data

US 2016/0124955 A1 May 5, 2016

(51) Int. Cl.
*G06F 17/30* (2006.01)

(52) U.S. Cl.
CPC .............................. *G06F 17/30445* (2013.01)

(58) Field of Classification Search
None
See application file for complete search history.

(56) References Cited

U.S. PATENT DOCUMENTS

| | | | |
|---|---|---|---|
| 6,925,466 B2 | 8/2005 | Jensen et al. | |
| 7,752,326 B2 | 7/2010 | Smit | |
| 2001/0047368 A1* | 11/2001 | Oshinsky | G06F 17/30106 |
| 2003/0065898 A1* | 4/2003 | Flamma | G06F 3/0601 |
| | | | 711/165 |
| 2004/0068479 A1 | 4/2004 | Wolfson et al. | |
| 2004/0230590 A1 | 11/2004 | Wookey et al. | |
| 2008/0155213 A1* | 6/2008 | Elliott | G06F 11/2094 |
| | | | 711/162 |
| 2008/0288498 A1* | 11/2008 | Hinshaw | G06F 17/30575 |
| 2009/0300040 A1* | 12/2009 | Kaijima | G06F 17/30306 |
| 2010/0153432 A1 | 6/2010 | Pfeifer et al. | |
| 2014/0181436 A1* | 6/2014 | Modzelewski | G06F 11/2087 |
| | | | 711/162 |
| 2014/0325121 A1* | 10/2014 | Akutsu | G06F 3/0604 |
| | | | 711/103 |
| 2015/0134708 A1* | 5/2015 | Cutforth | G06F 3/067 |
| | | | 707/809 |

(Continued)

OTHER PUBLICATIONS

Yongjun Jiao, Asynchronous (non-blocking) Execution in JDBC, Hibernate or Spring? Oct. 15, 2010, 5 pages, retrieved from http://java.dzone.com/tips/asynchronous-non-blocking on Oct. 29, 2014.

(Continued)

*Primary Examiner* — Richard Bowen
(74) *Attorney, Agent, or Firm* — Haynes and Boone, LLP

(57) ABSTRACT

An example method of processing a query at a plurality of storage devices includes receiving a dual query from a client and generating a synchronous query and an asynchronous query based on the dual query. The dual query includes a set of conditions for selecting data from a set of database tables. The method further includes sending the synchronous query to a first storage device, sending the asynchronous query to a second storage device, and receiving a result set of the synchronous query. The result set of the synchronous query includes data selected from a set of database records in a set of primary database tables, which is stored in the first storage device and is a subset of the set of database tables. The method further includes marking a database record. A marked database record indicates usage of the data selected from the database record within a time period.

20 Claims, 4 Drawing Sheets

(56) References Cited

U.S. PATENT DOCUMENTS

| | | | |
|---|---|---|---|
| 2015/0178807 A1* | 6/2015 | Tiwari | G06F 17/30412 |
| | | | 705/26.62 |
| 2015/0200833 A1* | 7/2015 | Cutforth | H04L 67/1097 |
| | | | 709/224 |
| 2015/0205531 A1* | 7/2015 | DeMattio | G06F 3/0689 |
| | | | 711/114 |
| 2016/0055171 A1* | 2/2016 | Araki | G06F 17/30174 |
| | | | 707/624 |

OTHER PUBLICATIONS

Is asynchronous Jdbc call possible?, 4 pages, Stack Overflow, retrieved from http://stackoverflow.com/questions/4087696/is-asynchronous-jdbc-call-possible on Oct. 29, 2014.

Java Driver 1.0 for Apache Cassandra, 1 page, retrieved from http://www.datastax.com/documentation/developer/java-driver/1.0/common/drivers/introduction/introArchOverview_c.html on Oct. 29, 2014.

Dathan Pattishall, Asynchronous Queries Verses Synchronous Queries, Nov. 9, 2009, 4 pages, MySQL DBA, Architecture, Software, Web, Dev, retrieved from http://mysqldba.blogspot.in/2009/11/asynchronous-queries-verses-synchronous.html on Oct. 29, 2014.

* cited by examiner

DUAL OVERLAY QUERY PROCESSING

FIELD OF DISCLOSURE

The present disclosure generally relates to data storage, and more specifically to processing a query at a plurality of storage devices.

BACKGROUND

A storage device may store data that can be accessed and updated. For example, a client may store data in a storage device and submit a query at a later point in time to access the data. As time passes, more and more data may be stored in the storage device. Unfortunately, although more data is being stored in the storage device, infrequently accessed data may still remain in the storage device and consume space. Accordingly, when a query is submitted to the storage device, the storage device may sift through a large amount of data that is infrequently used in order to retrieve the proper results.

A conventional approach to solving this problem is manual cleaning of the storage device by an administrator who tracks data usage and knows how current users are using the data. The administrator may learn or predict which data is frequently accessed. It may be time consuming, however, for the administrator to learn how data is currently being used and clean out the storage device based on that knowledge. Additionally, data usage changes with time. As such, the administrator will go through this process of learning about how data is being used and accessed from a storage device again and again in order to manually clean it out.

BRIEF SUMMARY

It may be desirable to migrate data from a primary storage device to a secondary storage device if the data has not been accessed for a while. Additional aspects are taken into account to provide for the retrieval of data from both the primary storage device and secondary storage device to ensure that a client has the complete result set of a query. Methods, systems, and techniques for processing a query at a plurality of storage devices are provided.

According to an embodiment, a method of processing a query at a plurality of storage devices includes receiving a dual query from a client. The dual query includes a set of conditions for selecting data from a first set of database tables. The method also includes generating a synchronous query based on the dual query and generating an asynchronous query based on the dual query. The method further includes sending the synchronous query to a first storage device and sending the asynchronous query to a second storage device. The method also includes receiving a result set of the synchronous query. The result set of the synchronous query includes data selected from a set of database records in a set of primary database tables. The set of primary database tables is stored in the first storage device and is a subset of the first set of database tables. The method further includes marking one or more database records of the set of database records. The one or more marked database records indicates usage of the data selected from the respective database record within a time period.

According to an embodiment, a system for processing a query at a plurality of storage devices includes a query proxy that receives a dual query from a client, generates a synchronous query and an asynchronous query based on the dual query, sends the synchronous query to a first storage device, and sends the asynchronous query to a second storage device. The dual query includes a set of conditions for selecting data from a first set of database tables. The query proxy also receives a result set of the synchronous query. The result set of the synchronous query includes data selected from a set of database records in a set of primary database tables, and the set of primary database tables is stored in the first storage device and is a subset of the first set of database tables. The query proxy also marks one or more database records of the set of database records. The one or more marked database records indicates usage of the data selected from the respective database record within a time period.

According to another embodiment, a non-transitory machine-readable medium including a plurality of machine-readable instructions that when executed by one or more processors is adapted to cause the one or more processors to perform a method including: receiving a dual query from a client, the dual query including a set of conditions for selecting data from a first set of database tables; generating a synchronous query based on the dual query; generating an asynchronous query based on the dual query; sending the synchronous query to a first storage device; sending the asynchronous query to a second storage device; receiving a result set of the synchronous query, the result set of the synchronous query including data selected from a set of database records in a set of primary database tables, and the set of primary database tables being stored in the first storage device and being a subset of the first set of database tables; and marking one or more database records of the set of database records, the one or more marked database records indicating usage of the data selected from the respective database record within a time period.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
III. Process a Dual Query
   A. Generate a Plurality of Queries Based on a Dual Query
   B. Process a Synchronous Query
      1. Result Set of Synchronous Query
      2. Mark Data in Primary Storage Device C. Process an Asynchronous Query
  1. Result Set of Asynchronous Query
  2. Application Receives Complete Result Set of Dual Query
  3. Mark Data in Secondary Storage Device
D. Data Migration
  1. Migrate Data From the Primary Storage Device to the Secondary Storage Device
  2. Migrate Data from the Secondary Storage Device to the Primary Storage Device
IV. Example Method
V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

As time passes, more and more data may be stored in a storage device. Unfortunately, although more data is being stored in the storage device, data that is not accessed very often (e.g., within a time window) still remains in the storage device. A conventional approach to solving this problem is manual cleaning of the databases and applying knowledge of how current users are using the databases.

The present disclosure provides techniques to migrate data from a primary storage device to a secondary storage device. Unless specifically stated otherwise, as apparent from the following discussion, it is appreciated that throughout the description, discussions utilizing terms such as "receiving", "generating", "sending", and "receiving", "marking", "scanning", "creating", "copying", "removing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
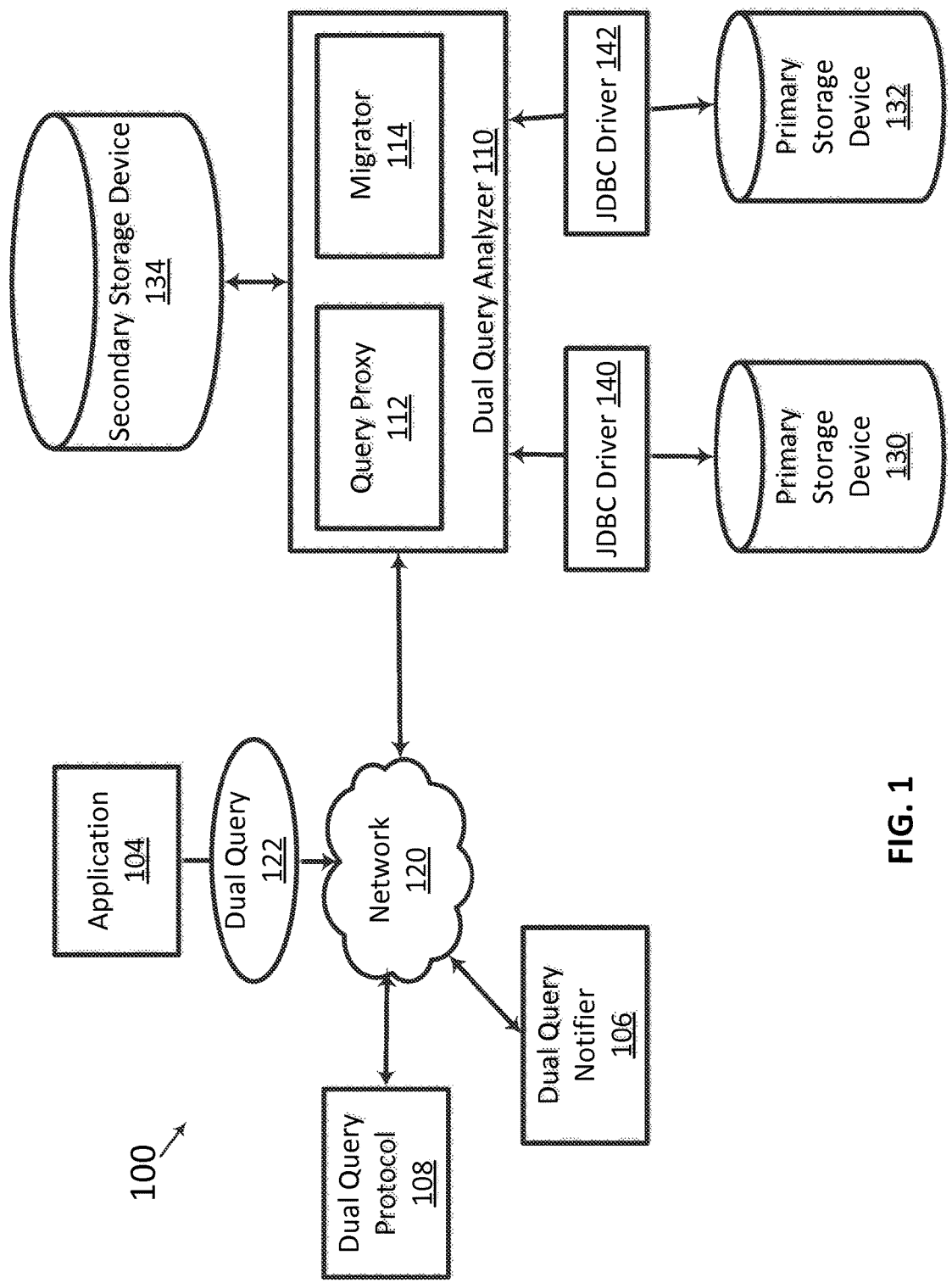
FIG. 1 is a block diagram illustrating a system for processing a query at a plurality of storage devices, according to some embodiments.

FIG. 1 is a block diagram illustrating a system 100 for processing a query at a plurality of storage devices, according to some embodiments. System 100 includes an application 104, dual query notifier 106, dual query protocol 108, and dual query analyzer 110 coupled over a network 120. Although one application, one dual query notifier, one dual query protocol, and one dual query analyzer are illustrated, this is not intended to be limiting, and system 100 may include one or more applications, dual query notifiers, dual query protocols, and/or dual query analyzers.

Network 120 may be a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Application 104 may be any application that is executable on a computing device having at least one processor and memory. The computing device may be a personal computer (PC), workstation, mobile device (e.g., a mobile phone, personal digital assistant (PDA), tablet, and laptop), game console, set-top box, kiosk, embedded system, or other device having at least one processor and memory. Additionally, the computing device may be a fat client (e.g., a client that performs local processing and data storage), a thin client (e.g., a client that performs minimal or no local processing and minimal to no data storage), and/or a hybrid client (e.g., a client that performs local processing but little to no data storage).

Application 104 submits one or more dual queries 122 to dual query analyzer 110. A dual query may refer to a single query from which two queries are generated and sent to different storage devices, as will be explained in more detail below. Dual query analyzer 110 provides features enabling a developer to increase data scalability of application 104. Dual query analyzer 110 may be executed in a single machine or multiple interconnected machines (e.g., machines configured in a cluster). Dual query analyzer 110 is coupled to primary storage devices 130 and 132, and may communicate with the primary storage devices through standard JAVA® Database Connectivity (JDBC) using JDBC drivers 140 and 142, respectively. Trademarks are the properties of their respective owners.

The following is a description of primary storage device 130. This description applies as well to primary storage device 132. Primary storage device 130 may store data that is accessible to one or more applications 104. With each passing day, the amount of data stored in primary storage device 130 may grow as users continue to store more data into the storage device. It may be desirable to limit the amount of data that is stored in primary storage device 130 and improve its performance by having the data that is likely to be accessed remain in the primary storage device and other data is not likely to be accessed migrated to a secondary storage device.

In the example illustrated in FIG. 1, dual query analyzer 110 is coupled to a secondary storage device 134 that may act as a "backup" storage for a primary storage device. The secondary storage may be cheap storage having a slow response time but high capacity. Primary storage device 130 and secondary storage device 134 may store data that is migrated from the primary storage device to the secondary storage device, and vice-versa. The storage devices may be external systems that store data accessible over network 120. Although dual query analyzer 110 is illustrated as being coupled to two primary storage devices and one secondary storage device, this is not intended to be limiting and dual query analyzer 110 may be coupled to one or more primary storage devices and/or more than one secondary storage device.

In some embodiments, dual query analyzer 110 is implemented in a data federation tool that is coupled to a plurality of autonomous data sources. The data federation tool may be able to access and update different storage device types because such a data federation tool may support the creation of custom translators (a connector to a data storage device of choice). In an example, primary storage devices 130 and 132 and secondary storage device 134 are autonomous data sources that belong to a data federation. In an example, primary storage devices 130 and 132 and secondary storage device 134 are heterogeneous data sources that accept different query formats relative to each other. In an example, primary storage device 130 is an ORACLE® database provided by ORACLE®, primary storage device 132 is a DB2® database provided by IBM®, and secondary storage device 134 is a large capacity storage device that has more storage capacity and is slower than the primary storage devices. In another example, primary storage device 130 is a web service, primary storage device 132 is an ORACLE® database provided by ORACLE®, and secondary storage device 134 is an outdated file system with limited throughput.

Dual query analyzer 110 includes a query proxy 112 and migrator 114. Each of query proxy 112 and migrator 114 may execute on a computing device having at least one processor and memory. As will be discussed in further detail below, query proxy 112 may receive queries, send them to their appropriate storage devices for execution, and receive the query results from the appropriate storage devices. Migrator 114 may migrate data between the primary and secondary storage devices.

III. Process a Dual Query

Application 104 may desire to retrieve data that is or is not stored in more than one storage device. Application 104 may send dual query 122 to dual query analyzer 110 for processing without knowing where the data actually resides (e.g., in primary storage device 130, primary storage device 132, or secondary storage device 134). Dual query 122 includes a set of conditions for selecting data from a set of database tables that may be stored in one or more of primary storage device 130, primary storage device 132, or secondary storage device 134.

Application 104 interacts with dual query analyzer 110 via dual query notifier 106 and dual query protocol 108 to retrieve data from the appropriate storage devices. In some embodiments, application 104 uses dual query protocol 108 to access dual query analyzer 110 for query processing. Dual query protocol 108 may be an application programming interface (API) that is invoked by application 104. Dual query protocol 108 may build on top of the protocol that is used as a communication mechanism between dual query analyzer 110 and primary storage device 130. In the example illustrated in FIG. 1, dual query analyzer 110 communicates with primary storage device 130 via JDBC. In this example, dual query protocol 108 may be an extension of the JDBC protocol and may be a JAVA® Archive File (JAR) file that contains the dual query protocol API.

A. Generate a Plurality of Queries Based on a Dual Query

Figure 2:
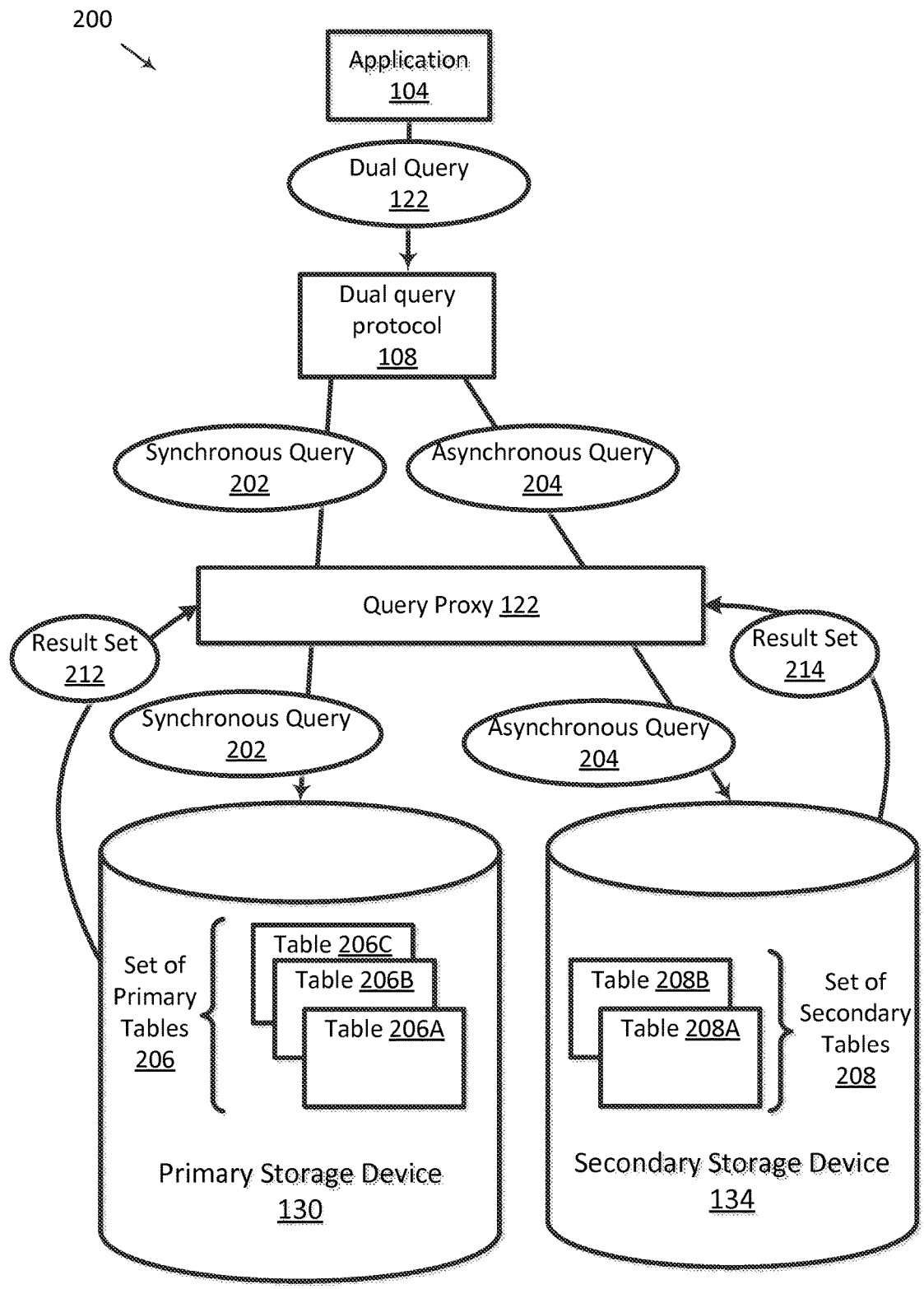
FIG. 2 is a block diagram illustrating a process flow for processing a dual query at a plurality of storage devices, according to some embodiments.

FIG. 2 is a block diagram illustrating a process flow 200 for processing a dual query at a plurality of storage devices, according to some embodiments. Dual query protocol 108 may receive dual query 122 from application 104 and generate a plurality of queries based on dual query 122. In the example illustrated in FIG. 2, dual query protocol 108 generates a synchronous query 202 based on dual query 122, generates an asynchronous query 204 based on dual query 122, and sends synchronous query 202 and asynchronous query 204 to query proxy 112 for further processing. Synchronous query 202 and asynchronous query 204 may each include the same set of conditions for selecting data from a set of database tables as is included in dual query 122.

Query proxy 112 may receive synchronous query 202 and asynchronous query 204, which are both based on dual query 122, and send each query to its appropriate storage device for execution. Synchronous query 202 and asynchronous query 204 may be different instances of the same query. In the example illustrated in FIG. 2, query proxy 112 sends synchronous query 202 to primary storage device 130 and sends asynchronous query 204 to secondary storage device 134. Synchronous query 202 may be marked as a synchronous query that is to be sent to primary storage device 130 through traditional database access techniques (e.g., JDBC driver 140). Asynchronous query 204 may be marked as an asynchronous query 204 that is to be sent to secondary storage device 134 through a different technique. Each of the storage devices executes their respective queries and sends a result set back to query proxy 112.

B. Process a Synchronous Query

1. Result Set of Synchronous Query

Query proxy 112 may receive a result set from each of the appropriate storage devices. In FIG. 2, query proxy 112 receives a result set 212 of synchronous query 202 from primary storage device 130. Primary storage device 130 may store database tables having zero or more database records. Each database table may have one or more columns and zero of more database records. In FIG. 2, primary storage device 130 includes a set of primary database tables 206 including primary database tables 206A, 206B, and 206C. Result set 212 includes data selected from a set of database records in the set of primary database tables 206. Set of primary database tables 206 is a subset of the tables identified in dual query 122 from which data is selected and returned in result set 212. Query proxy 112 may send result set 212 to application 104 via a synchronous channel so that application 104 can start using or viewing result set 212.

2. Mark Data in Primary Storage Device

Query proxy 112 may examine result set 212 and identify a set of database records including data in the result set. Query proxy 112 may mark one or more database records in set of primary database tables 206, where a marked database record in primary storage device 130 indicates usage of the data selected from the database record within a time period. The time period used to mark data in primary storage device 130 may be different from the time period used to mark data in primary storage device 132.

In some embodiments, a database record of set of primary database tables 206 may include a column indicating whether data stored in the respective database record satisfies a usage threshold. The usage threshold may be satisfied when the data stored in the respective database record has been accessed within a time period. Each database table of set of primary database tables 206 may include a "data usage" column that stores a Boolean value (not shown). When data from a database record in primary storage device 130 is accessed, query proxy 112 may mark the database record by setting a value in the "data usage" column to one. Any database record in set of primary database tables 206 may be marked as true (e.g., 1) to indicate that data in the database record has been accessed within a time period or may be marked as false (e.g., 0) to indicate that data in the database record has not been accessed within the time period. Query proxy 112 may send a request to primary storage device 130 to mark the appropriate database records. It should be understood that this is an example way to mark data and data may be marked in other ways. In another example, a separate table may be created and store pointers to accessed data in order to mark it. In this example, the pointer may indicate that the referenced database record has been accessed within a time period (e.g., one month) or has been accessed above a threshold number of times within a time period.

In an example, a marked database record in primary storage device 130 indicates that the marked database record has been accessed within a time window. In this example, query proxy 112 may identify data that is included in result set 212, identify the database records in set of primary database tables 206 from which the data was selected and included in result set 212, and set a value in the "data usage" column of the database records to one in order to mark them. In another example, a marked database record in primary storage device 130 indicates that the marked database record has been accessed above a threshold number of times within a time window. In this example, each time data from a database record is accessed, query proxy 112 may perform an extra action that increments a counter for the database record, and when the counter satisfies the threshold number of times (e.g., is greater than or equal to the threshold number of times), query proxy 112 may set the value in the "data usage" column of the database record to one in order to mark it.

C. Process an Asynchronous Query

The complete result set of dual query 122 may include data that is stored in primary storage device 130 as well as data that is stored in secondary storage device 134. In an example, the data stored in secondary storage device 134 may be out of reach of JDBC driver 140, as will be explained further below. Secondary storage device 134 may receive asynchronous query 204, execute it, and send a result set 214 of asynchronous query 204 back to query proxy 112. Query proxy 112 may receive result set 214 of asynchronous query 204 from secondary storage device 134.

Secondary storage device 134 may store database tables having zero or more database records. Each database table may have one or more columns and zero of more database records. In FIG. 2, secondary storage device 134 includes a set of secondary database tables 208 including secondary database tables 208A and 208B. Set of secondary database tables 208 is stored in secondary storage device 134 and may be a subset of the tables identified in dual query 122 from which data is selected and returned in result set 214.

1. Result Set of Asynchronous Query

In an example, secondary storage device 134 does not store any data that is included in the complete result set of dual query 122, and result set 214, which is the result set of asynchronous query 204, is of size zero. In this example, secondary storage device 134 may not store data included in the complete result set of dual query 122 for a variety of reasons. For example, data from primary storage device 130 may not yet have been migrated to secondary storage device 134. In another example, data from primary storage device 130 has been migrated to secondary storage device 134, but not the appropriate data that meets the set of conditions in dual query 122. Secondary storage device 134 may send a message indicating that result set 214 is of size zero to dual query protocol 108. Dual query protocol 108 may then forward this message to dual query notifier 106 through an asynchronous channel, and dual query notifier 106 may send application 104 a notification that result set 214 has a size of zero. In this example, application 104 receives result sets via two different channels—a synchronous channel and an asynchronous channel.

In another example, secondary storage device 134 stores data that is included in the complete result set of dual query 122. In this example, result set 214 includes data selected from a set of database records in set of secondary tables 208, and data stored in a primary storage device (e.g., primary storage device 130) has been migrated to secondary storage device 134. In this example, the set of secondary database tables is stored in second storage device 134 and is a subset of the set of database tables identified in dual query 122. Secondary storage device 134 may send result set 214 to dual query protocol 108. Dual query protocol 108 may then forward result set 214 to dual query notifier 106 through an asynchronous channel, and dual query notifier 106 may send result set 214 to application 104 through the asynchronous channel. Data from the set of primary database tables and data from the set of secondary database tables may be mutually exclusive.

2. Application Receives Complete Result Set of Dual Query

Data included in a result set may be stored in the primary storage device and the second storage device. As such, the complete result set of dual query 122 may be retrieved from two different storage devices, primary storage device 130 and secondary storage device 134. Typically, in response to a query sent from application 104 and executed at primary storage device 130, JDBC driver 140 returns result set 212.

It may be challenging for application 104 to receive the complete result set of dual query 122 via a synchronous channel and an asynchronous channel and then display them to a user of application 104. For example, the data in result set 212 may already be rendered for a user using application 104 and has just received a message indicating that more results are to be rendered in connection with dual query 122 for the user. In an example, application 104 may display to the user a dialogue window to inform the user that more data will populate the tables.

Dual query notifier 106 may modify the way in which application 104 receives results from the JDBC driver and provide an asynchronous mechanism to notify application 104 that additional results will be sent to application 104. Dual query notifier 106 provides application 104 with an asynchronous way to notify application 104 that an additional result set may be sent to application 104 to fulfill the complete result set of dual query 122. Accordingly, application 104 may receive the complete result set in two stages. A first stage may include the traditional way of receiving result set 212 and a second stage may include a different way of receiving result set 214. To ensure that application 104 receives the complete result set of dual query 122 and is able to accommodate result set 214, application 104 may register with dual query notifier 106 for notifications and the result set of an asynchronous query via an asynchronous channel.

3. Mark Data in Secondary Storage Device

Query proxy 112 may examine result set 214 and identify a set of database records including data in the result set. Query proxy 112 may mark one or more database records in set of secondary database tables 208, where a marked database record in secondary storage device 134 indicates usage of the data selected from the database record within a time period. The time period used to mark data in a primary storage device may be different from the time period used to mark data in a secondary storage device.

Each database table of set of secondary database tables 208 may include a "data usage" column that stores a Boolean value (not shown). When data from a database record in secondary storage device 134 is accessed, query proxy 112 may mark the database record by setting a value in the "data usage" column to one. Any database record in set of secondary database tables 208 may be marked as true (e.g., 1) to indicate that data in the database record has been accessed within a time period or may be marked as false (e.g., 0) to indicate that data in the database record has not been accessed within the time period. Query proxy 112 may send a request to secondary storage device 134 to mark the appropriate database records.

In an example, a marked database record in secondary storage device 134 indicates that the marked database record has been accessed within a time window. In this example, query proxy 112 may identify data that is included in result set 214, identify the database records in set of secondary database tables 208 from which the data was selected and included in result set 214, and set a value in the "data usage" column of the database records to one in order to mark them. In another example, a marked database record in secondary storage device 134 indicates that the marked database record has been accessed above a threshold number of times within a time window. In this example, each time data from a database record is accessed, query proxy 112 may perform an extra action that increments a counter for the database record, and when the counter satisfies the threshold number of times (e.g., is greater than or equal to the threshold number of times), query proxy 112 may set the value in the "data usage" column of the database record to one in order to mark it.

D. Data Migration

Migrator may run periodically based on a configured time interval and may scan both primary storage device 130 and secondary storage device 134 for data to migrate.

1. Migrate Data from the Primary Storage Device to the Secondary Storage Device

Migrator 114 may migrate data from one or more primary tables stored in primary storage device 130 to secondary storage device 134. Data that is unmarked in primary storage device 130 may eventually be migrated from primary storage device 130 to secondary storage device 134. In some embodiments, migrator 114 scans primary storage device 130 to identify unmarked database records in set of primary database tables 206. An unmarked database record in primary storage device 130 may indicate that the database record has not been recently used within a time period. In an example, an unmarked database record in primary storage device 130 indicates that the database record has not been accessed within the time period. In another example, an unmarked database record in primary storage device 130 indicates that the unmarked database record has not been accessed above a threshold number of times within a time period.

In an example, migrator 114 migrates unmarked database records in primary database table 206A to secondary storage device 134 by identifying the primary table's name and creating a secondary table in secondary storage device 134, where the secondary table has the same name as primary database table 206A. If the secondary table having the primary table's name already exists in secondary storage device 134, then it may be unnecessary to recreate this table in the secondary storage device. Migrator 114 may copy one or more unmarked database records stored in primary database table 206 to the secondary table and remove the copied database records from first storage device 130.

2. Migrate Data from the Secondary Storage Device to the Primary Storage Device

Over time, data usage may change and the data that was migrated from primary storage device 130 secondary storage device 134 may be accessed or accessed more frequently. To ensure that primary storage device 130 stores the most up-to-date data, query proxy 112 may also mark data stored in secondary storage device 134 for migration to primary storage device 130, where the marked data in secondary storage device 134 indicates that that data has been accessed within a time period.

To add flexibility, data stored in secondary storage device 134 may be marked for migration to primary storage device 130. Migrator 114 may migrate data from one or more secondary tables stored in secondary storage device 134 to primary storage device 130. Data that is marked in secondary storage device 134 may eventually be migrated from secondary storage device 134 to a primary storage device (e.g., primary storage device 130 or primary storage device 132).

In some embodiments, migrator 114 scans secondary storage device 134 to identify marked database records in set of secondary database tables 208. A marked database record in secondary storage device 134 may indicate that the database record has been recently used within a time period. In an example, a marked database record in secondary storage device 134 indicates that the database record has been accessed within the time period. In another example, a marked database record in secondary storage device 134 indicates that the marked database record has been accessed above a threshold number of times within a time period.

In an example, migrator 114 migrates marked database records in secondary storage device 134 to primary storage device 130 by identifying the secondary table's name and creating a primary table in primary storage device 130, where the primary table has the same name as secondary database table 208A. If the primary table having the secondary table's name already exists in the primary storage device, then it may be unnecessary to recreate this table in the primary storage device. Migrator 114 may copy one or more unmarked database records stored in primary database table 206 to secondary table 208A and remove the copied database records from secondary storage device 134.

Additionally, query proxy 112 may collect statistics about queries that were run and provide this information to migrator 114. Migrator 114 may use the information from query proxy 112 to actively migrate data to and from the different data sources.

As discussed above and further emphasized here, FIGS. 1 and 2 are merely examples, which should not unduly limit the scope of the claims. For example, it should be understood that one or more modules or components in FIG. 1 (e.g., query proxy 112 and migrator 114) may be combined with another module or component. It should also be understood that one or more modules or components in FIG. 1 may be separated into more than one module or component.

Additionally, although two levels of storage are described (e.g., the first level includes the primary storage device and the second level includes the secondary storage device), it should be understood that the present disclosure may be practiced using more than two levels of storage. For example, data may be stored in a first storage device (first level) and then migrated to a second storage device (second level), and data stored in the second storage device may be migrated to a third storage device (third level). This example may be helpful for databases that are expected to store a large amount of data.

Moreover, more than one primary storage device and/or more than one secondary storage device may store data included in a complete result set of a dual query. In an example, dual query protocol 108 may generate a synchronous query or an asynchronous query for each of these storage devices and then the appropriate query to the appropriate storage device. For example, if dual query analyzer 110 does not interact with a storage device using a JDBC, dual query protocol 108 may generate an asynchronous query for the dual query and send the asynchronous query to a secondary storage device.

IV. Example Method

Figure 3:
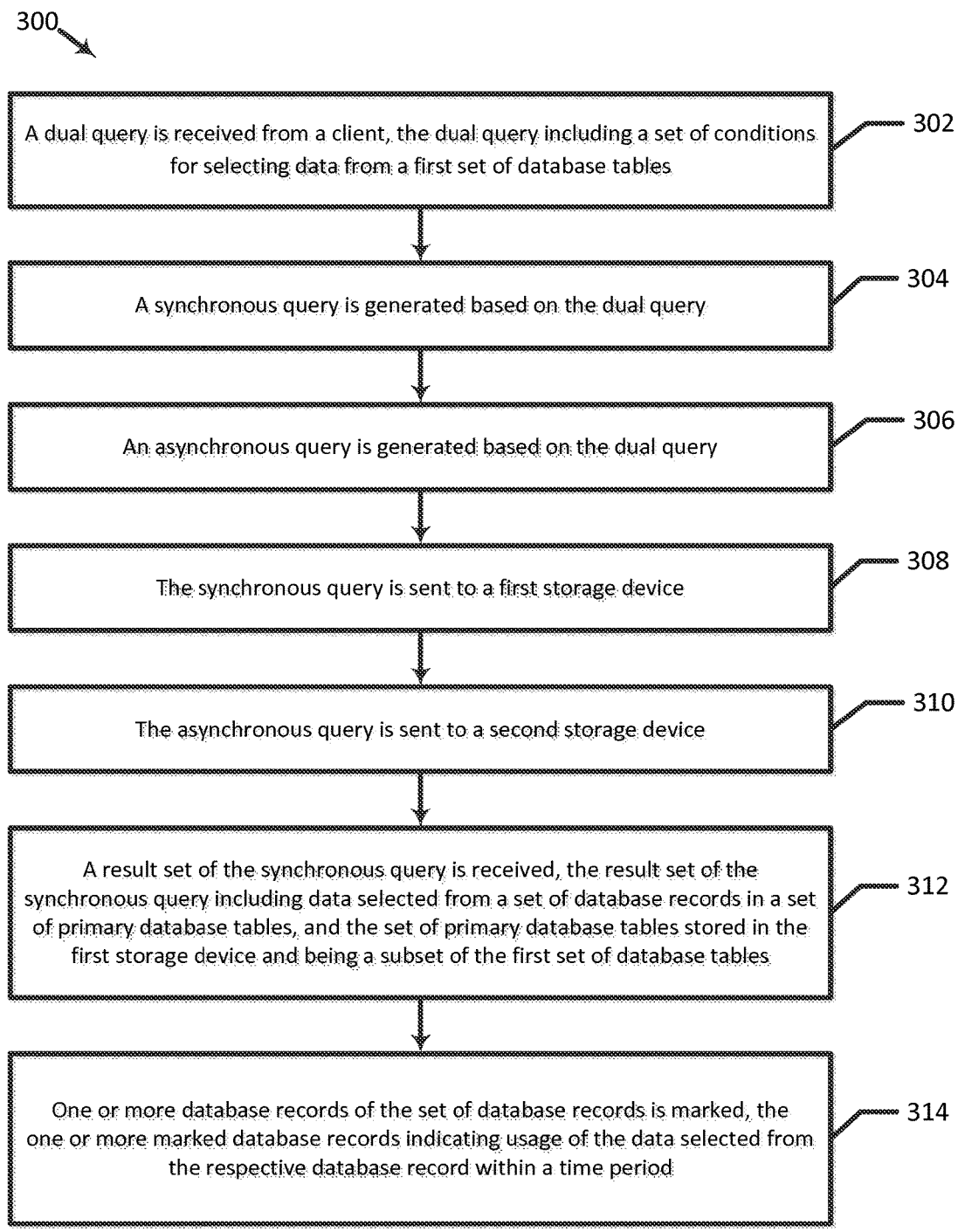
FIG. 3 is a flowchart illustrating a method of processing a query at a plurality of storage devices, according to some embodiments.

FIG. 3 is a flowchart illustrating a method 300 of processing a query at a plurality of storage devices, according to some embodiments. Method 300 is not meant to be limiting and may be used in other applications.

In FIG. 3, method 300 includes blocks 302-314. In a block 302, a dual query is received from a client, the dual query including a set of conditions for selecting data from a first set of database tables. In an example, query proxy 112 receives dual query 122 from application 104, dual query 122 including a set of conditions for selecting data from a first set of database tables. In a block 304, a synchronous query is generated based on the dual query. In an example, dual query protocol 108 generates synchronous query 202 based on dual query 122. In a block 306, an asynchronous query is generated based on the dual query. In an example, dual query protocol 108 generates asynchronous query 204 based on dual query 122.

In a block 308, the synchronous query is sent to a first storage device. In an example, query proxy 112 sends synchronous query 202 to primary storage device 130. In a block 310, the asynchronous query is sent to a second storage device. In an example, query proxy 112 sends asynchronous query 204 to secondary storage device 134.

In a block 312, a result set of the synchronous query is received, the result set of the synchronous query including data selected from a set of database records in a set of primary database tables, and the set of primary database tables stored in the first storage device and being a subset of the first set of database tables. In an example, query proxy 112 receives result set 212 of synchronous query 202, result set 212 of synchronous query 202 including data selected from a set of database records in set of primary database tables 206, which is stored in primary storage device 130 and a subset of the first set of database tables identified in the dual query.

In a block 314, one or more database records of the set of database records is marked, the one or more marked database records indicating usage of the data selected from the respective database record within a time period. In an example, migrator 114 marks one or more database records of the set of database records, the one or more marked database records indicating usage of the data selected from the respective database record within a time period.

In some embodiments, one or more actions illustrated in blocks 302-314 may be performed for any number of storage devices that may store data included in a complete result set of a dual query. Additionally, it is also understood that additional processes may be inserted before, during, or after blocks 302-314 discussed above. It is also understood that one or more of the blocks of method 300 described herein may be omitted, combined, or performed in a different sequence as desired.

V. Example Computing System

Figure 4:
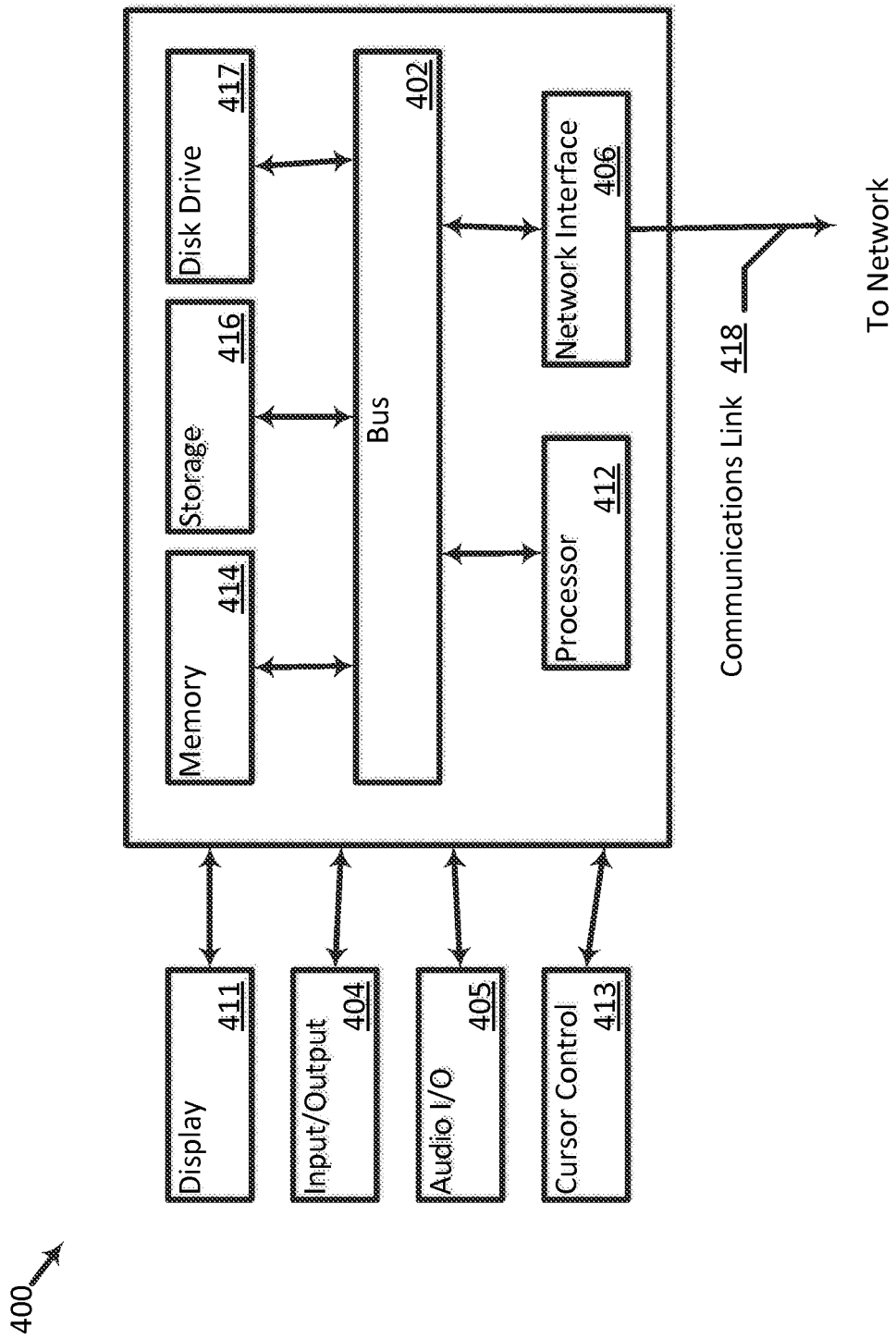
FIG. 4 is a block diagram of an electronic system suitable for implementing one or more embodiments of the present disclosure.

FIG. 4 is a block diagram of a computer system 400 suitable for implementing one or more embodiments of the present disclosure. Each of query proxy 112 and migrator 114 may execute on a computing device. The computing device may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. A processor 412, which may be a micro-controller, digital signal processor (DSP), or other processing component, processes these various signals, such as for display on computer system 400 or transmission to other devices via communication link 418. Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414.

Components include an input/output (I/O) component 404 that processes a user action, such as selecting keys from a keypad/keyboard, selecting one or more buttons or links, etc., and sends a corresponding signal to bus 402. I/O component 404 may also include an output component such as a display 411, and an input control such as a cursor control 413 (such as a keyboard, keypad, mouse, etc.). An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable.

Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of processing a query at a plurality of storage devices, comprising:
   receiving a dual query from a client, the dual query including a set of conditions for selecting data from a first set of database tables;
   generating a synchronous query based on the dual query;
   generating an asynchronous query based on the dual query;
   sending the synchronous query to a first storage device;
   sending the asynchronous query to a second storage device;
   receiving a first result set of the synchronous query and a second result set of the asynchronous query, the first result set including first data selected from a first set of database records in a set of primary database tables stored in the first storage device, the second result set including second data selected from a second set of database records in a set of secondary database tables stored in the second storage device, and the second data having been migrated from the first storage device to the second storage device;
   marking one or more database records of the first set of database records, the one or more marked database records indicating usage of the data selected from the respective database record within a time period;
   copying one or more unmarked database records stored in the first storage device to the second storage device; and
   removing the copied database records stored in the first storage device from the first storage device.

2. The method of claim 1, wherein each of the synchronous query and asynchronous query includes the set of conditions for selecting data from the first set of database tables.

3. The method of claim 1, wherein a marked database record in the first storage device indicates that the marked database record has been accessed within the time period.

4. The method of claim 1, wherein a marked database record in the first storage device indicates that the marked database record has been accessed above the threshold number of times within a time window.

5. The method of claim 1, further including:
   scanning the first storage device to identify one or more unmarked database records, the one or more identified unmarked database records being in a primary table of the set of primary database tables; and
   creating a secondary table in the secondary storage device, the secondary table having the same name as the primary table, wherein the copying one or more unmarked database records stored in the first storage device to the second storage device includes copying the one or more unmarked database records stored in the primary table to the secondary table.

6. The method of claim 1, wherein the first data and the second data are mutually exclusive.

7. The method of claim 1, further including:
   marking one or more database records of the second set of database records, the one or more marked database records of the second set of database records indicating usage of the data selected from the respective database record within a second time period;
   copying one or more marked database records stored in the second storage device to the first storage device; and
   removing the copied database records stored in the secondary storage device from the secondary storage device.

8. The method of claim 7, wherein the marking one or more database records of the second set of database records includes setting a value in a column of the respective database record of the second set.

9. The method of claim 7, further including:
   scanning the second storage device to identify one or more marked database records, the one or more identified marked database records being in a secondary table of the set of secondary database tables.

10. The method of claim 1, wherein each of the set of primary database tables and the set of secondary database tables is a subset of the first set of database tables.

11. The method of claim 1, further comprising:
    notifying, via an asynchronous channel, the client that to fulfill a complete result set of the dual query the second result set may be sent to the client in addition to the first result set.

12. A system for processing a query at a plurality of storage devices, comprising:
    a query proxy that receives a dual query from a client, generates a synchronous query and an asynchronous query based on the dual query, sends the synchronous query to a first storage device, and sends the asynchronous query to a second storage device, wherein the dual query includes a set of conditions for selecting data from a first set of database tables,
    wherein the query proxy receives a first result set of the synchronous query and a second result set of the asynchronous query, wherein the first result set includes first data selected from a first set of database records in a set of primary database tables stored in the first storage device, wherein the second result set includes second data selected from a second set of database records in a set of secondary database tables stored in the second storage device; and
a migrator that marks one or more database records of the first set of database records, copies one or more unmarked database records stored in the first storage device to the second storage device, and removes the copied database records stored in the first storage device from the first storage device, wherein the one or more marked database records indicate usage of the data selected from the respective database record.

13. The system of claim 12, wherein a storage capacity of the first storage device is smaller than a storage capacity of the second storage device.

14. The system of claim 12, wherein each database record of the second set of database tables includes a column indicating whether data stored in the respective database record satisfies a usage threshold.

15. The system of claim 14, wherein the usage threshold is satisfied when the data stored in the respective database record has been accessed within a time period.

16. The system of claim 12, wherein the migrator
scans the first storage device to identify one or more unmarked database records, creates a secondary table in the secondary storage device, and copies the one or more unmarked database records stored in the primary table to the secondary table,
wherein the one or more identified unmarked database records is in a primary table of the set of primary database tables, and the secondary table has the same name as the primary table.

17. The system of claim 12, wherein the query proxy marks one or more database records of the second set of database records, wherein the migrator copies one or more marked database records stored in the second storage device to the first storage device and removes the copied database records stored in the secondary storage device from the secondary storage device, and wherein the one or more marked database records of the second set of database records indicates usage of the data selected from the respective database record within a second time period.

18. The system of claim 12, wherein the:
migrator scans the second storage device to identify one or more marked database records,
wherein the one or more identified marked database records is in a secondary table of the set of secondary database tables.

19. The system of claim 12, wherein at least one database table of the second set of primary database tables has the same name as a database table of the set of secondary database tables.

20. A machine-readable medium comprising a plurality of machine-readable instructions that when executed by one or more processors is adapted to cause the one or more processors to perform a method comprising:
receiving a dual query from a client, the dual query including a set of conditions for selecting data from a first set of database tables;
generating a synchronous query based on the dual query;
generating an asynchronous query based on the dual query;
sending the synchronous query to a first storage device;
sending the asynchronous query to a second storage device;
receiving a first result set of the synchronous query and a second result set of the asynchronous query, the first result set including first data selected from a first set of database records in a set of primary database tables stored in the first storage device, the second result set including second data selected from a second set of database records in a set of secondary database tables stored in the second storage device, and the second data having been migrated from the first storage device to the second storage device;
marking one or more database records of the first set of database records, the one or more marked database records indicating usage of the data selected from the respective database record within a time period;
copying one or more unmarked database records stored in the first storage device to the second storage device; and
removing the copied database records stored in the first storage device from the first storage device.

* * * * *